US008020379B2

(12) United States Patent
Kakino et al.

(10) Patent No.: US 8,020,379 B2
(45) Date of Patent: Sep. 20, 2011

(54) DOUBLE REDUNDANCY ELECTRO HYDROSTATIC ACTUATOR SYSTEM

(75) Inventors: Atsushi Kakino, Aichi-ken (JP); Hiroshi Saito, Aichi-ken (JP); Kenta Kawasaki, Aichi-ken (JP); Takashi Oka, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 529 days.

(21) Appl. No.: 12/285,734

(22) Filed: Oct. 14, 2008

(65) Prior Publication Data

US 2009/0165457 A1 Jul. 2, 2009

(30) Foreign Application Priority Data

Dec. 26, 2007 (JP) ................................ 2007-335204

(51) Int. Cl.
*F15B 9/03* (2006.01)
*B64C 13/40* (2006.01)

(52) U.S. Cl. .............. 60/405; 91/510; 60/418; 244/78.1

(58) Field of Classification Search .................... 60/403, 60/405, 406, 418; 91/509, 510; 244/78.1
See application file for complete search history.

(56) References Cited

U.S. PATENT DOCUMENTS 4,257,311 A * 3/1981 Barnsley et al. ................ 91/510
6,446,432 B1 * 9/2002 Flavell ............................ 60/405
6,817,067 B2 * 11/2004 Kopp et al. ...................... 91/508
6,981,439 B2 * 1/2006 Hart ............................... 91/509

FOREIGN PATENT DOCUMENTS

JP 2001-295802 10/2001
JP 2005-240974 9/2005

* cited by examiner

*Primary Examiner* — Thomas E Lazo
(74) *Attorney, Agent, or Firm* — Wenderoth, Lind & Ponack, L.L.P.

(57) ABSTRACT

A double redundancy electro hydrostatic actuator system includes two hydraulic pumps; two fail safe valves connected with the two hydraulic pumps, respectively; one dual tandem hydraulic cylinder connected with the two fail safe valves and having a piston rod, wherein the piston rod is moved by switching supply and discharge of the fluid; two switching valves connected with the two fail safe valves; two accumulators connected with the two switching valves and the two hydraulic pumps, respectively; and two chambers connected with the two switching valves, respectively. Each of the two accumulators accumulates the fluid from a corresponding one of the two hydraulic pumps, and sends the fluid to a corresponding one of the two fail safe valves. The two chambers receive the fluid from the two fail safe valves, respectively.

8 Claims, 6 Drawing Sheets

DOUBLE REDUNDANCY ELECTRO HYDROSTATIC ACTUATOR SYSTEM

INCORPORATION BY REFERENCE

This patent application claims priority on convention based on Japanese Patent Application No. 2007-335204 filed on Dec. 26, 2007. The disclosure thereof is incorporated herein by reference.

BACKGROUND OF THE INVENTION

1. Field of the Invention

The present invention relates to a double redundancy electro hydrostatic actuator system with a dual tandem hydraulic cylinder driven by using two systems of hydraulic circuits.

2. Description of Related Art

A double redundancy electro hydrostatic actuator system for controlling a dual tandem hydraulic cylinder by two systems of hydraulic circuits is known. Such a double redundancy hydrostatic actuator system is adopted in a wing of an airplane. That is, two systems of hydraulic circuits are provided to allow a dual tandem hydraulic cylinder to be operated, even when either of the two systems of hydraulic circuits does not operate.

FIG. 1 shows a conventional hydraulic actuator system. Two systems (A system and B system) of hydraulic pressure circuits are connected to the hydraulic cylinder 18. Each system mainly includes a hydraulic source 2, a reservoir 4, a servo valve 6, a relief valve 8, a fail safe valve hydraulic source 10, a fail safe valve reservoir 12, a solenoid valve 14 and a fail safe valve 16. The hydraulic source 2 supplies hydraulic fluid to a dual tandem hydraulic cylinder 18. A wall 22 is provided for a main body of the hydraulic cylinder 18. The wall 22 separates a space for hydraulic fluid supplied from the A system from a space for hydraulic fluid supplied from the B system. Flows of the hydraulic fluid from the A system and the B system are supplied to each other, thereby moving a piston rod 20 in the hydraulic cylinder 18.

A fail safe valve 16 has a structure with a spool valve 27 taking any of three states and small and large pistons for switching the three states. A first one of the three stats is a state that the hydraulic fluid is supplied from the hydraulic source 2 to the hydraulic cylinder 18 or returned from the hydraulic cylinder 18. A second one thereof is a state that the hydraulic source 2 stops the supply of hydraulic fluid to the hydraulic cylinder 18 when either the A system or the B system cannot operate due to a failure, and closes the hydraulic circuits between the fail safe valve 16 and the hydraulic cylinder 18 so that the hydraulic cylinder 18 may be moved by only a normally operating system. A third one thereof is a state that the hydraulic source 2 stops the supply of the hydraulic fluid to the hydraulic cylinder 18 and closes the hydraulic circuits between the fail safe valve 16 and the hydraulic cylinder 18 when both of the A system and the B system cannot operate due to a failure, and in addition, a flow of the hydraulic fluid is reduced by orifice. In the third state, the piston rod 20 performs a damping operation, since the flow of the hydraulic fluid is reduced even when external force is applied to the piston rod 20. Switching of the fail safe valve 16 is performed among the three states by supplying the hydraulic fluid to the small and large pistons of the fail safe valve 16 such that the spool valve 27 is switched by the fail safe valve hydraulic source 10.

Japanese Patent Application Publication (JP-P2001-295802A) discloses an electro hydrostatic actuator including a first position control system and a second position control system. The first position control system is a closed control system formed from a first operation section of the actuator, a position sensor for detecting the position of the first operation section, a controller, and an electric motor controlled by the controller to drive the hydraulic pump. The second position control system is a system which drives a second operation section for changing a displacement of the hydraulic pump in a direction of low displacement when a detection position signal outputted from the position sensor is coincident with a support position signal received by the controller.

SUMMARY

An object of the present invention is to provide a compact and light-weight electro hydrostatic actuator system in which a dual tandem hydraulic cylinder is controlled by two systems of hydraulic circuits.

In an aspect of the present invention, a double redundancy electro hydrostatic actuator system includes two hydraulic pumps; two fail safe valves connected with the two hydraulic pumps, respectively; one dual tandem hydraulic cylinder connected with the two fail safe valves and having a piston rod, wherein the piston rod is moved by switching supply and discharge of the fluid; two switching valves connected with the two fail safe valves; two accumulators connected with the two switching valves and the two hydraulic pumps, respectively; and two chambers connected with the two switching valves, respectively. Each of the two accumulators accumulates fluid from a corresponding one of the two hydraulic pumps, and sends the fluid to a corresponding one of the two fail safe valves. The two chambers receive the fluid from the two fail safe valves, respectively.

In another aspect of the present invention, a method of controlling a double redundancy electro hydrostatic actuator system, is achieved by generating hydraulic of a predetermined pressure by two hydraulic pumps, respectively; by accumulating fluids from the two hydraulic pumps by two accumulators, respectively; by controlling two switching valves to transfer the hydraulic pressures from the two accumulators to two fail safe valves, respectively; by controlling the two fail safe valves to transfer the hydraulic pressures from the two switching valves to a dual tandem hydraulic cylinder; and by driving a piston rod of the hydraulic pressure actuator with the hydraulic pressures.

According to the present invention, a compact and light-weight double redundancy electro hydrostatic actuator system is provided in which the dual tandem hydraulic cylinder is controlled by two systems of hydraulic circuits.

DESCRIPTION OF THE PREFERRED EMBODIMENTS

Hereinafter, a double redundancy electro hydrostatic actuator system of the present invention will be described in detail with reference to the attached drawings.

First Embodiment

Figure 1:
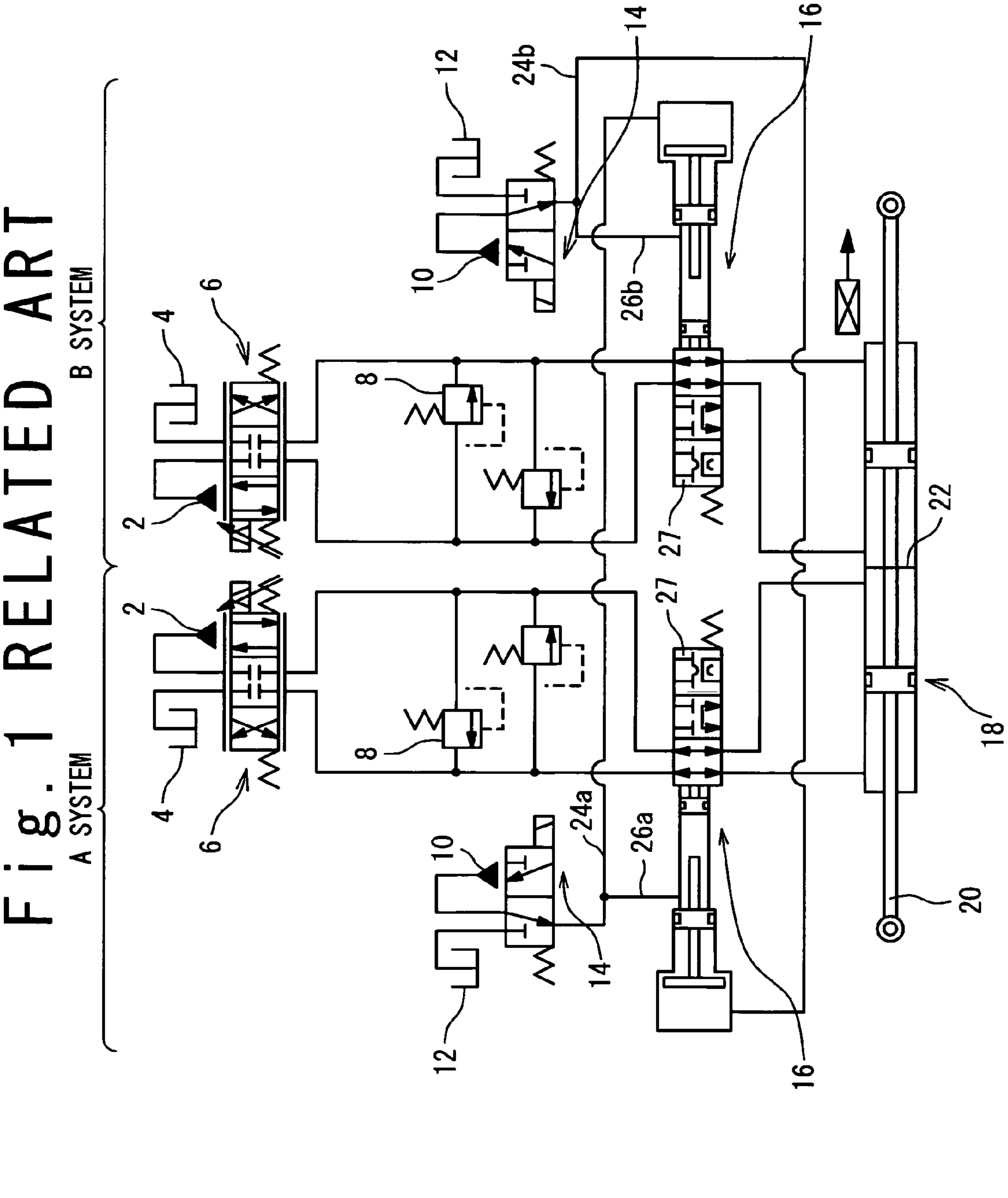
Fig. 1 RELATED ART
FIG. 1 shows a conventional hydraulic actuator system.
Figure 2:
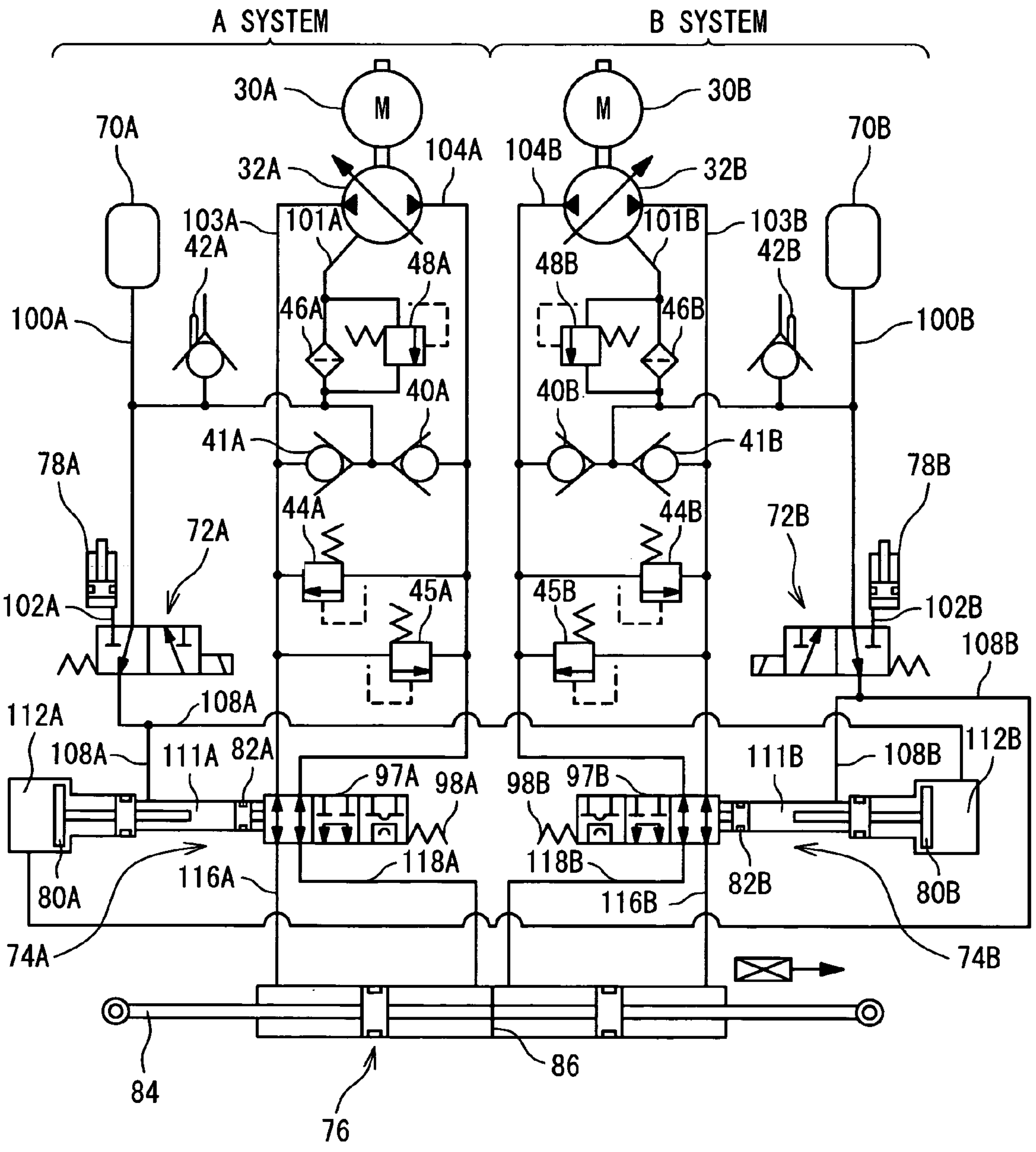
FIG. 2 shows a double redundancy electro hydrostatic actuator system according to a first embodiment of the present invention.

FIG. 2 shows a configuration of a fail safe valve system according to a first embodiment of the present invention. The fail safe valve of the electro hydrostatic actuator system includes a dual tandem hydraulic cylinder 76 and a hydraulic circuit of an A system and a hydraulic circuit of a B system. The hydraulic cylinder 76 is provided with a piston rod 84 and a wall 86. The wall 86 divides a space inside the hydraulic cylinder 76 into a space for hydraulic fluid from the hydraulic circuit of the A system and a space for hydraulic fluid from the hydraulic circuit of the B system. The hydraulic cylinder 76 moves the piston rod 84 based on the hydraulic pressure supplied from the hydraulic circuit of the A system and the hydraulic pressure supplied from the hydraulic circuit of the B system.

The hydraulic circuit of the A system is provided with an electric motor 30A, a variable displacement hydraulic pump 32A, a fail safe valve 74A, a solenoid valve 72A, a pop-up chamber 78A, a check valve 40A, a check valve 41A, a relief valve 44A, a relief valve 45A, a filter circuit 46A, a relief valve 48A, an accumulator 70A, and a refill valve 42A. Moreover, the hydraulic circuit of the A system is provided with a plurality of circuits which lead hydraulic fluid to transfer a hydraulic pressure. The plurality of circuits contains a hydraulic circuit 100A between the accumulator 70A and the solenoid valve 72A, a circuit 101A, a hydraulic circuit 102A between the pop-up chamber 78A and the solenoid valve 72A, a circuit 103A, a circuit 104A, a circuit 116A, a circuit 118A and a hydraulic circuit 108A.

The electric motor 30A has a rotatable shaft and is connected to the hydraulic pump 32A through the shaft. The motor 30A generates rotation force based on the supplied electric current to rotate the shaft. The hydraulic pump 32A discharges the hydraulic pressure which flows through the circuits 103A and 104A by using the rotation force transferred from the electric motor 30A through the shaft.

The relief valve 44A connects the circuit 104A with the circuit 103A only when the hydraulic pressure of the circuit 104A is higher than that of the circuit 103A by a predetermined pressure. The relief valve 45A connects the circuit 103A with the circuit 104A only when the hydraulic pressure of the circuit 103A is higher than that of the circuit 104A by a predetermined pressure. The filter circuit 46A is interposed between the circuit 101A and the hydraulic circuit 100A between the accumulator 70A and the solenoid valve 72A. The filter circuit 46A removes contaminants in the hydraulic operating fluid. The relief valve 48A connects the circuit 101A with the circuit 100A only when the hydraulic pressure of the circuit 101A is higher than that of the circuit 100A by a predetermined pressure. The check valve 40A connects the circuit 100A with the circuit 104A only when the hydraulic pressure of the circuit 100A is higher than that of the circuit 104A. The check valve 41A connects the circuit 100A with the circuit 103A only when the hydraulic pressure of circuit 100A is higher than that of the circuit 103A.

The accumulator 70A is connected with the hydraulic circuit 100A and accumulates the inner leakage of the hydraulic pump 32A. The pressure generated in the accumulator 70A at this time is called a case drain pressure of the hydraulic pump 32A. The pop-up chamber 78A receives the hydraulic fluid from the hydraulic circuit 102A between the pop-up chamber 78A and the solenoid valve 72A. The solenoid valve 72A connects one of the hydraulic circuit 100A between the accumulator 70A and the solenoid valve 72A and the hydraulic circuit 102A between the pop-up chamber 78A and the solenoid valve 72A with the hydraulic circuit 108A in response to a fail safe signal which is generated when a failure has occurred in the hydraulic circuit of the A system.

The fail safe valve 74A is connected with the circuits 103A, 104A, 116A, and 118A, the hydraulic circuit 108A and a hydraulic circuit 108B. The fail safe valve 74A is provided with a spool valve 97A, a small piston 82A, a large piston 80A, and a spring 98A. A first fail safe valve chamber 111A is formed between the small piston 82A and the large piston 80A and a second fail safe valve chamber 112A is formed on the large piston side. The first hydraulic chamber 111A is connected with the hydraulic circuit 108A, and the second hydraulic chamber 112A is connected with the hydraulic circuit 108B. The spool valve 97A is arranged to internally contact a spool chamber and is inserted to be slidable into a direction L or R. The spool valve 97A is driven and switched to one of a normal state 92A, a bypass state 94A and a damping state 96A by the spool valve 97A sliding into the direction L or R based on the hydraulic pressure of the hydraulic circuit 108A and the hydraulic pressure of the hydraulic circuit 108B.

The fail safe valve 74A connects the circuit 103A with the circuit 116A and the circuit 104B with the circuit 118A, when being switched to the normal state 92A. The fail safe valve 74A closes the circuit 103A and the circuit 104A and connects the circuit 116A and the circuit 118A when being switched to the bypass state 94A. The fail safe valve 74A closes the circuits 103A and 104A and connects the circuit 116A and the circuit 118A through the orifice when being switched to the damping state 96A. The spring 98A applies external elastic force to the spool valve 97A such that the spool valve 97A moves to the direction L.

The small piston 82A is arranged to internally contact the first hydraulic chamber 111A to be slidable into the direction L or R. Also, the large piston 80A is arranged to internally contact the second hydraulic chamber 112A so as to be slidable into the direction L or R. The large piston 80A moves to the direction R when the hydraulic pressure in the second hydraulic chamber 112A is higher than the hydraulic pressure of the first hydraulic chamber 111A. At this time, the large piston 80A limits the movement of the small piston 82A such that the small piston 82A does not move freely from a predetermined position into the direction L. Thus, the position of the spool valve 97A is limited to take the normal state 92A or the bypass state 94A and not to take the damping state 96A. The small piston 82A drives the spool valve 97A into the direction R when the hydraulic pressure of the first hydraulic chamber 111A is higher than the elastic force of the spring 98A. The spring 98A drives the spool valve 97A into the direction L when the hydraulic pressure of the first hydraulic chamber 111A is low and the hydraulic pressure of the second hydraulic chamber 112A is high. At this time, since the movement of the spool valve 97A is limited by the large piston 80A, the spool valve 97A is settled in a predetermined position, i.e., the bypass state. The spring 98A drives the spool valve 97A into the direction L when the hydraulic pressure of the first chamber 111A is low and the hydraulic pressure of the second hydraulic chamber 112A is low. At this time, the spool valve 97A is settled in a predetermined position, i.e., the damping state 96A.

The fail safe valve 74A is switched to one of the normal state 92A, the bypass state 94A and the damping state 96A by the spool valve 97A sliding into the direction L or R. That is, the state is switched between the normal state 92A and the bypass state 94A and between the bypass state 94A and the damping state 96A by the spool valve 97A moving to the direction L or R. The fail safe valve 74A connects the circuit 103A with the circuit 116A and the circuit 104A with the circuit 118A, when being switched to the normal state 92A. The fail safe valve 74A closes the circuit 103A and the circuit 104A and connects the circuit 118A and the circuit 116A when being switched to the bypass state 94A. The fail safe valve 74A closes the circuit 103A and the circuit 104A and connects the circuits 118A and the circuit 116A through the orifice when being switched to the damping state 96A.

Figure 3:
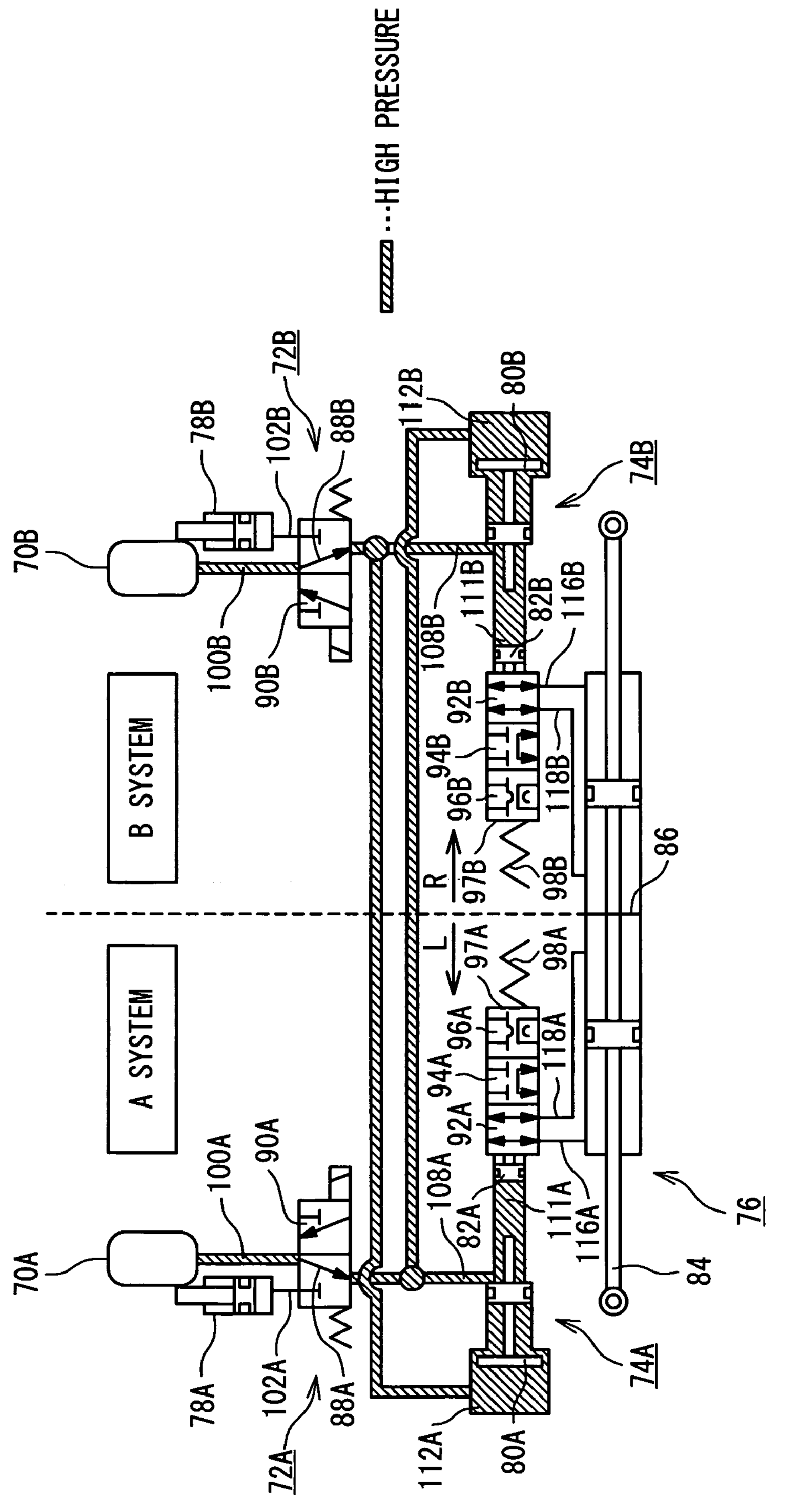
FIG. 3 shows a state of a fail safe valve when two systems of hydraulic circuits are normally operated.

The solenoid valve 72A is provided with a feed circuit 88A and a return circuit 90A, as shown in FIG. 3. The solenoid valve 72A switches the state in response to a failure signal which is generated when a failure has occurred in the hydraulic circuit of the A system. The solenoid valve 72A closes the hydraulic circuit 102A between the pop-up chamber 78A and the solenoid valve 72A in an open state when the failure signal is not supplied, and connects the hydraulic circuit 100A with the hydraulic circuit 108A through the feed circuit 88A. The solenoid valve 72A closes the hydraulic circuit 100A when the failure signal is supplied and connects the hydraulic circuit 108A with the hydraulic circuit 102A through the return circuit 90A.

In the above description, the A system is described mainly. However, the same things can be applied to the B system.

Next, states of the fail safe valves of the two systems will be described with reference to FIGS. 3 to 5.

FIG. 3 shows a state of the fail safe valve when the two systems of hydraulic circuits normally operate. Operations of the fail safe valves 74A and 74B when both the A system and the B system normally operate will be described. First, the A system will be described. A case drain pressure of the hydraulic pump 32A is accumulated in the accumulator 70A in the A system, and the hydraulic pressure is transferred from the accumulator 70A to the fail safe valve 74A through the hydraulic circuit 100A, the feed circuit 88A of the solenoid valve 72A, and the hydraulic circuit 108A. The hydraulic circuit 108A is connected to the hydraulic chamber 112B which houses the large piston 80B of the fail safe valve 74B in the B system. Meanwhile, the hydraulic circuit 108A is connected to the first chamber 111A which houses the small piston 82A of the fail safe valve 74A in the A system. Since the hydraulic fluid has a pressure, the small piston 82A in the A system is pushed in a direction of R in FIG. 3 and the large piston 80B in the B system is pushed in a direction of L in FIG. 3. Thus, the spool valve 97A is pushed toward the small piston 82A by the spring 98A. In the state shown in FIG. 3, the small piston 82A pushes the spool valve 97A in the direction of R in FIG. 3 to set the normal state 92A in which the hydraulic circuit 116A and the hydraulic circuit 118A are connected with the hydraulic circuits 103A and 104A. That is, the hydraulic pressure is transferred between the hydraulic pump 32A and the hydraulic cylinder 76A.

Next, the B system will be described. The case drain pressure of the variable capacitance hydraulic pump 32B is accumulated in the accumulator 70B in the B system, and the hydraulic pressure is transferred from the accumulator 70B to the fail safe valve 74B through the hydraulic circuit 100B, the feed circuit 88B of the solenoid valve 72B, and the hydraulic circuit 108B. The hydraulic circuit 108B is connected to the second chamber 112A which houses the large piston 80A of the fail safe valve 74A in the A system. Also, the hydraulic circuit 108B is connected to the first chamber 111B which houses the small piston 82B of the fail safe valve 74B in the B system. Since the hydraulic fluid has a pressure, the small piston 82B in the B system is pushed in the direction of L in FIG. 3 and the large piston 80A in the A system is pushed in the direction of R in FIG. 3. The spool valve 97B can take either of the normal state 92B, the bypass state 94B and the damping state 96B and is pushed toward the small piston 82B by the spring 98B. In the state shown in FIG. 3, the small piston 82B pushes the spool valve 97B in the direction of L in FIG. 3 to set the normal state 92B in which the hydraulic circuit 116B and the hydraulic circuit 118B are connected to the spool valve 97B. Namely, the hydraulic is transferred between the hydraulic pump 32B and the hydraulic cylinder 76.

Figure 4:
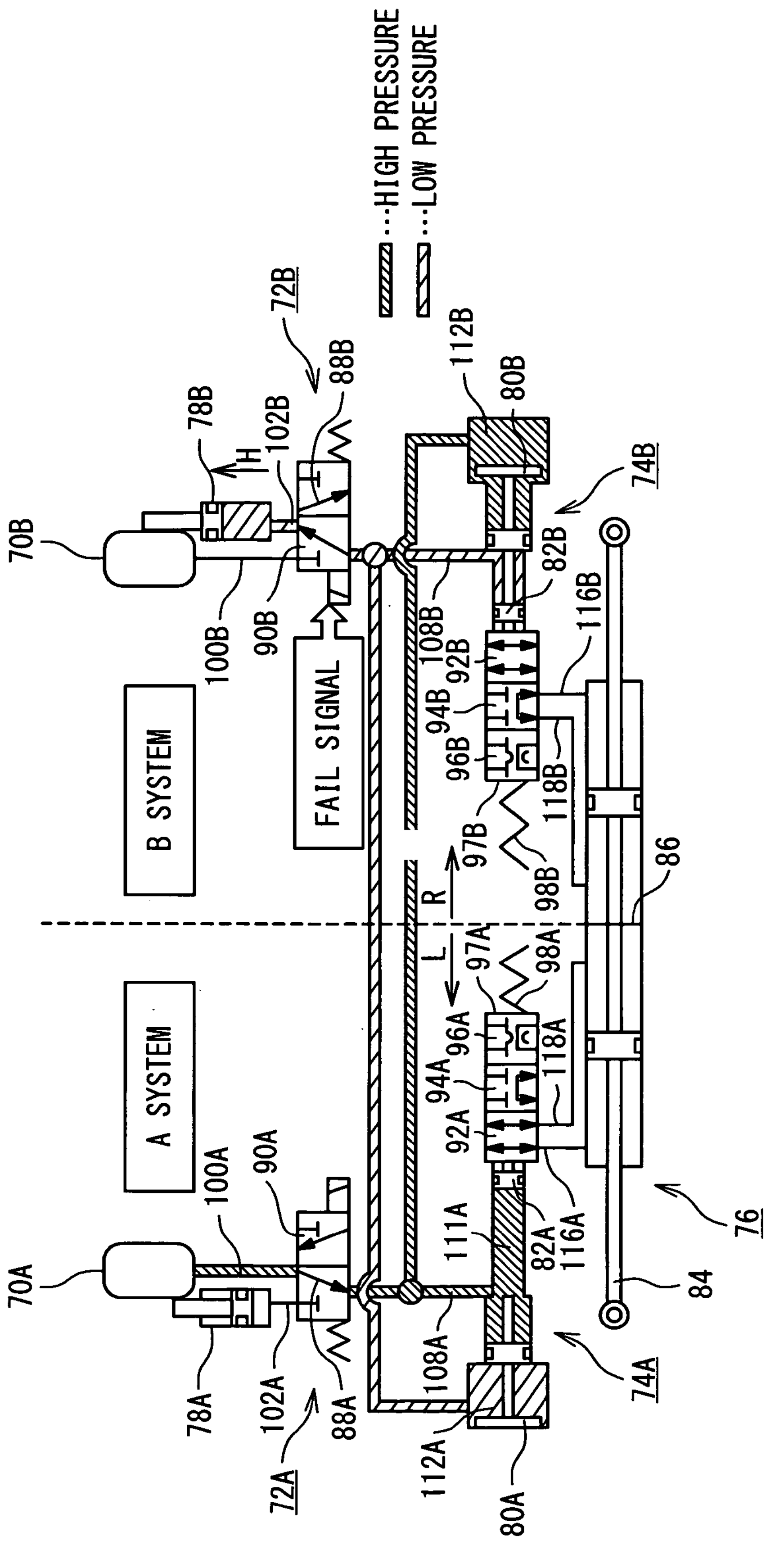
FIG. 4 shows a state of the fail safe valve when one system of hydraulic circuit fails down.

FIG. 4 shows states of the fail safe valves 74A and 74B when either of two systems of hydraulic circuits fails down. A case will be described where the failure has occurred at any point in the B system. First, the A system will be described. Since the A system is in the normal state, the hydraulic pressure accumulated in the accumulator 70A in the A system is transferred from the hydraulic circuit 100A to the fail safe valves 74A and 74B through the feed circuit 88A of the solenoid valve 72A. The hydraulic circuit 108A is connected to the second chamber 112B which houses the large piston 80B of the fail safe valve 74B in the B system. Also, the hydraulic circuit 108A is connected to the first chamber 111A which houses the small piston 82A of the fail safe valve 74A in the A system. Since the hydraulic fluid has a pressure, the small piston 82A in the A system is pushed in the direction of R in FIG. 4 and the large piston 80B in the B system is pushed in the direction of L in FIG. 4. The spool valve 97A can takes either of the normal state 92A, the bypass state 94A and the damping state 96A. In this case, the spool valve 97A can be set to the normal state 92A and is pushed toward the small piston 82A. In the state shown in FIG. 4, the small piston 82A pushes the spool valve 97A in the direction of R in FIG. 4 to set the normal state 92A in which the hydraulic circuit 116A and the hydraulic circuit 118A are connected to the hydraulic pump 32A. That is, the hydraulic pressure is transferred between the hydraulic pump 32A and the hydraulic cylinder 76A.

Next, the B system will be described. A fail signal is given to the solenoid valve 72B in the B system, the supply of the hydraulic pressure from the accumulator 70B is stopped and a return circuit 90B is connected to the pop-up chamber 78B. The pop-up chamber 78B serves to receive and absorb the hydraulic pressure. Accordingly, by returning the hydraulic fluid from the hydraulic circuit 108B connected to the solenoid valve 72B in the B system, the pop-up chamber 78B receives the hydraulic pressure. Since the piston of the pop-up chamber 78B moves in the direction of H in FIG. 4, the returned hydraulic fluid is received in the pop-up chamber 78B. As a result, the large piston 80A in the A system moves in a direction of L in FIG. 4 due to the hydraulic pressure of the hydraulic circuit 108A, and the small piston 82B in the B system moves in the direction of R in FIG. 4 due to force of the spring 98B such that the spool valve 97B moves in the direction of R. Thus, the small piston 82B contacts the large piston 80B in the B system. Through limitation of the movement of the small piston 82B in the B system, the spool valve 97B is set to the bypass state 94B and the hydraulic circuit 116B and the hydraulic circuit 118B are connected. In the bypass state 94B, the spool valve 97B stops the supply of the hydraulic pressure from the hydraulic pump 32B to the hydraulic cylinder 76 and allows movement of the hydraulic fluid remaining in the hydraulic cylinder 76, the hydraulic circuit 116B and the hydraulic circuit 118B. Consequently, when the hydraulic cylinder 76 is to be operated by the A system, the piston rod 84 can be operated. That is, the B system can be separated.

Figure 5:
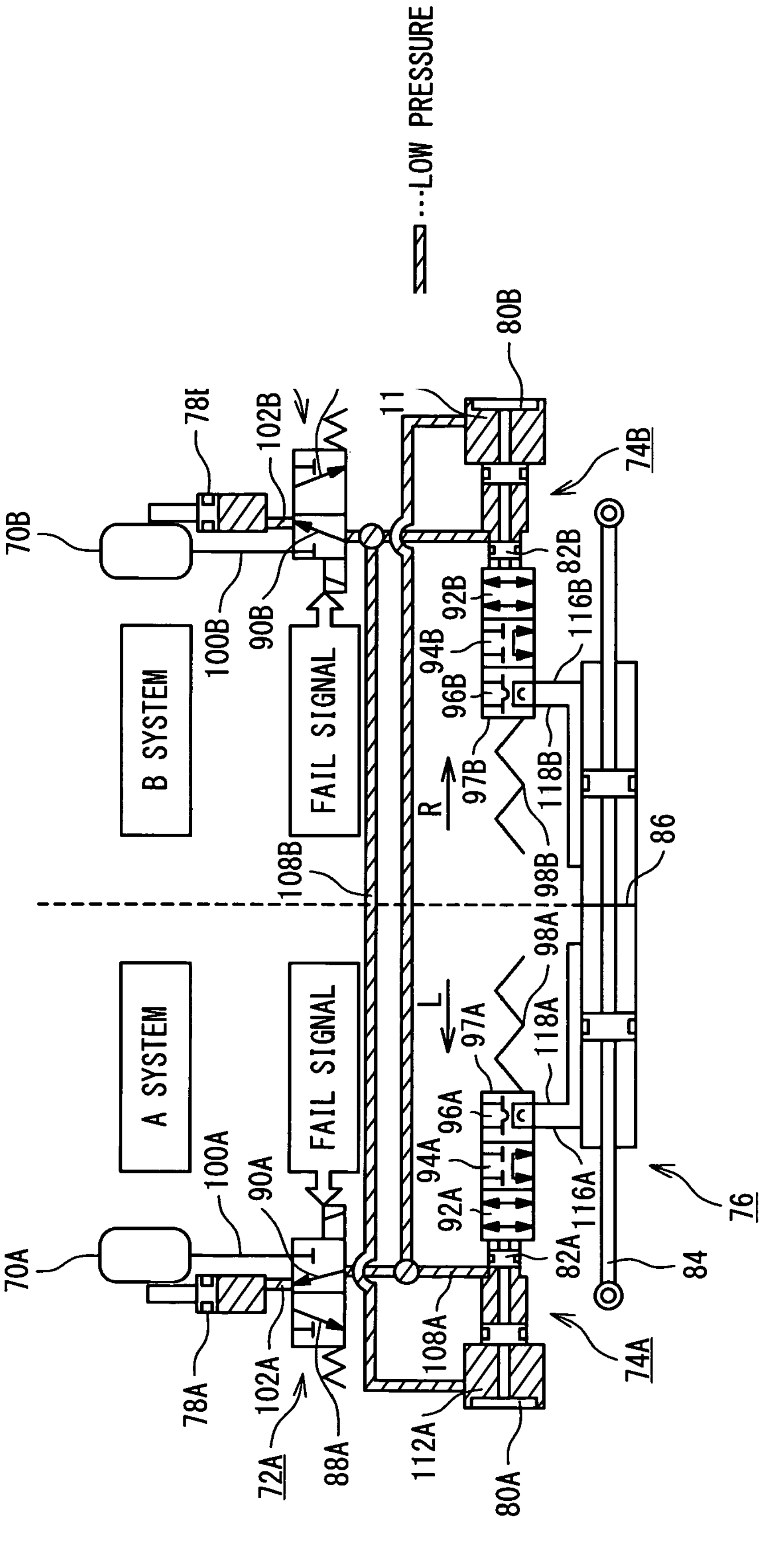
FIG. 5 shows a state of the fail safe valve when both of two systems of hydraulic circuits fail down.

FIG. 5 shows states of the fail safe valves when both of the two systems of hydraulic circuits fail down. The fail signal is supplied to each of the solenoid valves 72A and 72B in the A system and the B system. The supply of the hydraulic pressures from the accumulators 70A and 70B in the A system and the B system is stopped and the return circuits 90A and 90B are connected to the pop-up chambers 78A and 78B. The pop-up chambers 78A and 78B serve to receive and absorb the hydraulic pressures. Accordingly, the hydraulic fluid is returned from the hydraulic circuit 108A connected to the solenoid valves 72A in the A system, and the pop-up chamber 78A in the A system receives the hydraulic pressure. The hydraulic pressure is returned from the hydraulic circuit 108B connected to the solenoid valve 72B in the B system and the pop-up chamber 78B in the B system receives the hydraulic pressure.

As a result, both the large piston 80A and the small piston 82A of the fail safe valve 74A in the A system moves in a direction of L in FIG. 5 due to the force of the spring 98A. The large piston 80B and the small piston 82B in the fail safe valve 74B of the B system move in a direction of R in FIG. 5. Through the movement of the small piston 82A in the A system, the spool valve 97A is set to the damping state 96A and the hydraulic circuit 116A and the hydraulic circuit 118A are connected through an orifice. Furthermore, through the movement of the small piston 82B in the B system, the spool valve 97B is switched to the damping state 96B and the hydraulic circuit 116B and the hydraulic circuit 118B are connected to each other through an orifice. In the damping state 96A, the spool valve 97A stops the supply of the hydraulic pressure from the hydraulic pump 32A to the hydraulic cylinder 76A and allows movement of the hydraulic fluid remaining in the hydraulic cylinder 76, the hydraulic circuit 116A and the hydraulic circuit 118A. However, due to a configuration of reducing the flow of the hydraulic fluid by the orifice, even when an external force is applied to the piston rod 84, the piston rod 84 does not smoothly operate and thus a damping operation is performed against the external force.

As described above, the hydraulic sources for operating the fail safe valves 74A and 74B are ensured by the accumulators 70A and 70B. Accordingly, to operate the fail safe valves 74A and 74B, a hydraulic pump or a hydraulic circuit having some distances is not required. The accumulators 70A and 70B or the pop-up chambers 78A and 78B are lighter than the hydraulic pump or the hydraulic piping. Therefore, according to the present invention, a light-weight double redundancy electro hydrostatic actuator system as a whole can be built.

Second Embodiment

Figure 6:
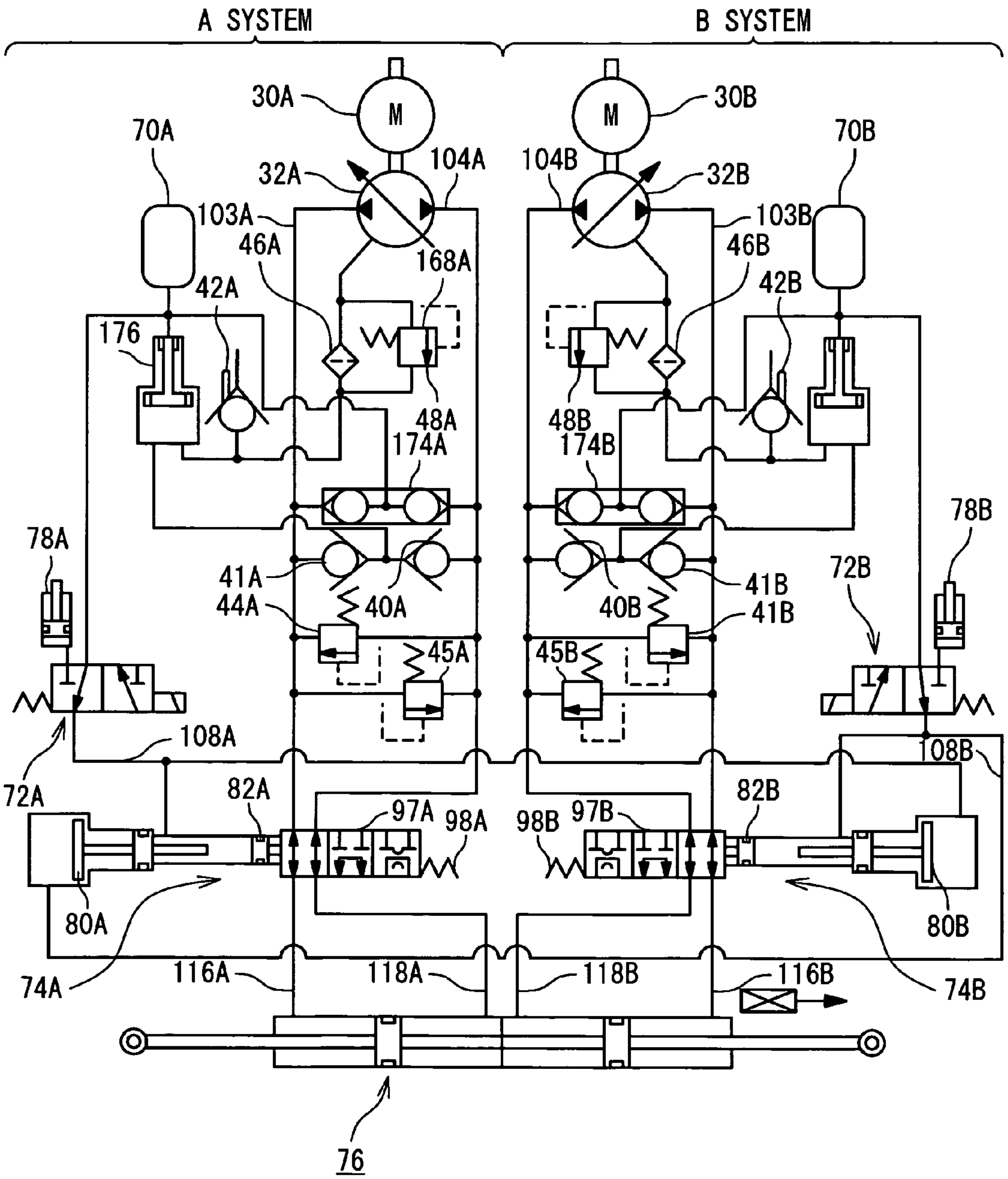
FIG. 6 shows the electro hydrostatic actuator system according to a second embodiment of the present invention.

FIG. 6 shows the configuration of the double redundancy electro hydrostatic actuator system according to a second embodiment of the present invention. The system includes two systems (A system and B system) of hydraulic circuits to the dual tandem hydraulic cylinder 76. The same and similar components are assigned with the same and similar reference numerals and the detailed description of them is omitted.

In the A system, the electric motor 30A is connected to a variable displacement hydraulic pump 32A which is the hydraulic source for working the hydraulic cylinder 76. The hydraulic pressure of the hydraulic pump 32A on the high pressure side is accumulated in the accumulator 70A through the shuttle valve 174A. The accumulator 70A is connected to the solenoid valve 72A. The pop-up chamber 78A is attached to the solenoid valve 72A. The solenoid valve 72A is connected to the fail safe valves 74A and 74B through the hydraulic circuit 108A. Furthermore, the fail safe valve 74A is connected to the hydraulic cylinder 76 through the hydraulic circuits 116A and 118A. The hydraulic pressure accumulated in the accumulator 70A is transferred to the fail safe valve 74A through the solenoid valve 72A. As described in the first embodiment, when the fail signal is supplied to the solenoid valve 72A, the solenoid valve 72A operates to stop the supply of the hydraulic pressure from the accumulator 70A, and the hydraulic fluid is returned to the pop-up chamber 78A and the fail safe valve 74A operates. An operation of the fail safe valve 74A is the same as that in first embodiment. The B system operates in the same manner as the A system.

The hydraulic pressure accumulated in the accumulator 70A can be used as the case drain pressure of the hydraulic pump 32A. However, when the hydraulic pressure accumulated in the accumulator 70A is directly supplied from the hydraulic pump 32A as the case drain pressure, a pressure exceeding a pressure resistance of the pump case of the hydraulic pump 32A is applied to the pump case, thereby possibly destroying the hydraulic pump 32A. Thus, the hydraulic pressure accumulated in the accumulator 70A is transferred to a boot strap reservoir 176A to feed the reduced pressure to the hydraulic pump 32A.

What is claimed is:

1. A double redundancy electro hydrostatic actuator system comprising:
- two hydraulic pumps;
- two fail safe valves connected with said two hydraulic pumps, respectively;
- one dual tandem hydraulic cylinder connected with said two fail safe valves and having a piston rod, wherein said piston rod is moved by switching supply and discharge of fluid;
- two switching valves connected with said two fail safe valves;
- two accumulators connected with said two switching valves and said two hydraulic pumps, respectively; and
- two chambers connected with said two switching valves, respectively,
- wherein each of said two accumulators accumulates the fluid from a corresponding one of said two hydraulic pumps, and sends the fluid to a corresponding one of said two fail safe valves, and
- said two chambers receive the fluid from said two fail safe valves, respectively.

2. The electro hydrostatic actuator system according to claim 1, wherein each of said two accumulators accumulates a case drain pressure as the pressure of the fluid necessary to operate an internal mechanism of a corresponding one of said two hydraulic pumps.

3. The electro hydrostatic actuator system according to claim 1, wherein each of said two accumulators accumulates a discharge pressure of the fluid generated from a corresponding one of said two hydraulic pumps, and
- said electro hydrostatic actuator system further comprises:
- a boot strap reservoir configured to reduce the accumulated pressure to generate the fluid with the pressure necessary to operate an internal mechanism of a corresponding one of said two hydraulic pumps.

4. The electro hydrostatic actuator system according to claim 1, wherein each of said two fail safe valves comprises a spool valve, a small piston and a large piston, wherein said spool valve is set to one of a normal state, a bypass state and a damping state, a first fail safe valve of said two fail safe valves:

connects a first hydraulic pump of said two hydraulic pumps with said hydraulic cylinder when said two switching valves are in an open state, the hydraulic pressure is applied to said small and large pistons from said two accumulators, and said spool valve is in the normal state due to the hydraulic pressure applied to said small piston, connects said first hydraulic pump with said hydraulic cylinder when a first switching valve of said two switching valves is in the open state, the hydraulic pressure is applied to only said small piston, and said spool valve is in the normal state due to the hydraulic pressure applied to said small piston, connects two first discharge hydraulic circuits of said hydraulic cylinder when a second switching valve of said two switching valves is in a close state, the hydraulic pressure is applied to only said large piston without application of any hydraulic pressure to said small piston, such that said spool valve is moved by spring force, and said large piston limits a position of said small piston such that said spool valve is in the bypass state, and connects said two first discharge hydraulic circuits through an orifice when said two switching valves is in the close state, such that the hydraulic pressure is not applied to said small and large pistons, and said spool valve is in the damping state due to spring force, and a second fail safe valve of said two fail safe valves:

connects a second hydraulic pump of said two hydraulic pumps with said hydraulic cylinder when said two switching valves are in the open state, the hydraulic pressure is applied to said small and large pistons from said two accumulators, and said spool valve is in the normal state due to the hydraulic pressure applied to said small piston, connects said second hydraulic pump with said hydraulic cylinder when said second switching valve is in the open state, the hydraulic pressure is applied to only said small piston, and said spool valve is in the normal state due to the hydraulic pressure applied to said small piston, and connects said two second discharge hydraulic circuits when said first switching valve is in the close state, the hydraulic pressure is applied to only said large piston without application of any hydraulic pressure to said small piston such that said spool valve is moved by spring force, and said large piston limits a position of said small piston such that said spool valve is in the bypass state.

5. A method of controlling an electro hydrostatic actuator system, comprising:

generating fluid of a predetermined pressure by two hydraulic pumps, respectively;

accumulating fluids from the two hydraulic pumps by two accumulators, respectively;

controlling two switching valves to transfer the hydraulic pressures from said two accumulators to two fail safe valves, respectively;

controlling the two fail safe valves to transfer the hydraulic pressures from the two switching valves to a duel tandem hydraulic cylinder; and driving a piston rod of the hydraulic cylinder based on the hydraulic pressures.

6. The method according to claim 5, wherein said accumulating comprises:

accumulating a case drain pressure as the pressure of the fluid necessary to operate an internal mechanism of a corresponding one of said two hydraulic pumps.

7. The method according to claim 5, wherein said accumulating comprises:

accumulating a discharge pressure of the fluid generated from a corresponding one of said two hydraulic pumps; and reducing the accumulated hydraulic pressure to generate the fluid with the pressure necessary to operate an internal mechanism of a corresponding one of said two hydraulic pumps.

8. The method according to claim 5, wherein each of said two fail safe valves comprises a spool valve, a small piston and a large piston, wherein said spool valve is set to one of a normal state, a bypass state and a damping state, said controlling the two fail safe valves comprises:

connecting a first hydraulic pump of said two hydraulic pumps with said hydraulic cylinder when said two switching valves are in an open state, the hydraulic pressure is applied to said small and large pistons from said two accumulators, and said spool valve is in the normal state due to the hydraulic pressure applied to said small piston;

connecting said first hydraulic pump with said hydraulic cylinder when a first switching valve of said two switching valves is in the open state, the hydraulic pressure is applied to only said small piston, and said spool valve is in the normal state due to the hydraulic pressure applied to said small piston;

connecting two first discharge hydraulic circuits of said hydraulic cylinder when a second switching valve of said two switching valves is in the close state, the hydraulic pressure is applied to only said large piston without application of any hydraulic pressure to said small piston, such that said spool valve is moved by spring force, and said large piston limits a position of said small piston such that said spool valve is in the bypass state;

connecting said two first discharge hydraulic circuits through an orifice when said two switching valves are in a close state, such that the hydraulic pressure is not applied to said small and large pistons, and said spool valve is in the damping state due to spring force;

connecting a second hydraulic pump of said two hydraulic pumps with said hydraulic cylinder when said two switching valves are in the open state, the hydraulic pressure is applied to said small and large pistons from said two accumulators, and said spool valve is in the normal state due to the hydraulic pressure applied to said small piston;

connecting said second hydraulic pump with said hydraulic cylinder when said second switching valve is in the open state, the hydraulic pressure is applied to only said small piston, and said spool valve is in the normal state due to the hydraulic pressure applied to said small piston; and connecting said two second discharge hydraulic circuits when said first switching valve is in the close state, the hydraulic pressure is applied to only said large piston without application of any hydraulic pressure to said small piston such that said spool valve is moved by spring force, and said large piston limits a position of said small piston such that said spool valve is in the bypass state.

* * * * *